(12) United States Patent
Luo

(10) Patent No.: US 6,627,712 B2
(45) Date of Patent: *Sep. 30, 2003

(54) MANUFACTURE OF CONJUGATED DIENE POLYMERS BY USING AN IRON-BASED CATALYST COMPOSITION

(75) Inventor: Steven Luo, Akron, OH (US)

(73) Assignee: Bridgestone Corporation, Tokyo (JP)

( * ) Notice: Subject to any disclaimer, the term of this patent is extended or adjusted under 35 U.S.C. 154(b) by 263 days.

This patent is subject to a terminal disclaimer.

(21) Appl. No.: 09/788,802

(22) Filed: Feb. 19, 2001

(65) Prior Publication Data

US 2002/0156210 A1 Oct. 24, 2002

(51) Int. Cl.$^7$ .............................. C08F 4/60; B01J 31/28
(52) U.S. Cl. ........................ 526/129; 526/171; 526/335; 502/152; 502/153; 502/154; 502/155; 502/158; 502/162
(58) Field of Search ................ 502/102, 152, 502/153, 154, 155, 158, 162; 526/171, 172, 335, 129

(56) References Cited

U.S. PATENT DOCUMENTS

| | | | |
|---|---|---|---|
| 3,419,505 A | 12/1968 | Marsico | 260/2 |
| 3,457,186 A | 7/1969 | Marsico | 252/429 |
| 3,498,963 A | 3/1970 | Ichikawa et al. | 260/94.3 |
| 3,725,373 A | 4/1973 | Yoo | 260/88.7 R |
| 3,778,424 A | 12/1973 | Sugiura et al. | 260/94.3 |
| 3,957,894 A | 5/1976 | Saeki et al. | 260/66 |
| 4,048,418 A | 9/1977 | Throckmorton | 526/138 |
| 4,148,983 A | 4/1979 | Throckmorton et al. | 526/139 |
| 4,168,357 A | 9/1979 | Throckmorton et al. | 526/139 |
| 4,168,374 A | 9/1979 | Throckmorton et al. | 526/139 |
| 4,182,813 A | 1/1980 | Makino et al. | 526/92 |
| 4,379,889 A | 4/1983 | Ashitaka et al. | 525/247 |
| 4,645,809 A | 2/1987 | Bell | 526/140 |
| 4,751,275 A | 6/1988 | Witte et al. | 526/139 |
| 5,239,023 A | 8/1993 | Hsu et al. | 526/141 |
| 5,283,294 A | 2/1994 | Hsu et al. | 525/247 |
| 5,356,997 A | 10/1994 | Massie, II et al. | 525/237 |
| 5,677,405 A | 10/1997 | Goodall et al. | 526/281 |
| 5,891,963 A | 4/1999 | Brookhart et al. | 525/326.1 |
| 5,919,875 A | 7/1999 | Luo et al. | 526/139 |
| 6,160,063 A | * 12/2000 | Luo | 526/139 |
| 6,180,734 B1 | * 1/2001 | Luo | 526/139 |
| 6,277,779 B1 | 8/2001 | Luo | 502/154 |
| 6,433,237 B1 | * 8/2002 | Luo | 585/507 |

FOREIGN PATENT DOCUMENTS

| | | |
|---|---|---|
| EP | 0 994 128 A1 | 4/2000 |
| EP | 0 994 128 A2 * | 4/2000 |
| EP | 0 994 129 A1 | 4/2000 |

OTHER PUBLICATIONS

Syndiotactic 1,2–Polybutadiene with Co–CS$_2$ Catalyst System I. Preparation Properties and Application of Highly Crystalline Syndiotactic 1,2–Polybutadiene, II. Catalyst for Stereospecific Polymerization of Butadiene to Syndiotactic 1,2–Polybutadiene, III. $^1$H and $^{13}$C–NMR Study of Highly Syndiotactic 1,2–Polybutadiene and IV Mechanism of Syndiotactic Polymerization of Butadiene with Cobalt Compounds–Organoaluminum–CS$_2$, *Journal of Polymer Science: Polymer Chemistry Edition*, by H. Ashitaka et al., vol. 21, pp. 1853–1860 and 1951–1995, (1983).

Comprehensive Polymer Science, by Porri and Giarrusso, Pergamon Press, Oxford, vol. 4, pp. 53, (1989).

English Abstract of Japanese Patent No. 48–6939. (1975).
English Abstract of Japanese Patent No. 48/64178, (1973).
English Abstract of Japanese Patent No. 45011154, (1970).

* cited by examiner

*Primary Examiner*—Robert Harlan
(74) *Attorney, Agent, or Firm*—Arthur M. Reginelli

(57) ABSTRACT

A catalyst composition that is the combination of or the reaction product of ingredients comprising (a) an iron-containing compound, (b) a silyl phosphonate, and (c) an organoaluminum compound.

20 Claims, No Drawings

MANUFACTURE OF CONJUGATED DIENE POLYMERS BY USING AN IRON-BASED CATALYST COMPOSITION

FIELD OF THE INVENTION

The present invention relates to an iron-based catalyst composition for polymerizing conjugated dienes such as 1,3-butadiene into polymers such as syndiotactic 1,2-polybutadiene.

BACKGROUND OF THE INVENTION

Syndiotactic 1,2-polybutadiene is a crystalline thermoplastic resin that has a stereoregular structure in which the side-chain vinyl groups are located alternately on the opposite sides in relation to the polymeric main chain. Syndiotactic 1,2-polybutadiene is a unique material that exhibits the properties of both plastics and rubber, and therefore it has many uses. For example, films, fibers, and various molded articles can be made from syndiotactic 1,2-polybutadiene. It can also be blended into and co-cured with natural or synthetic rubbers in order to improve the properties thereof. Generally, syndiotactic 1,2-polybutadiene has a melting temperature within the range of about 195° C. to about 215° C., but due to processability considerations, it is generally desirable for syndiotactic 1,2-polybutadiene to have a melting temperature of less than about 195° C.

Various transition metal catalyst systems based on cobalt, titanium, vanadium, chromium, and molybdenum for the preparation of syndiotactic 1,2-polybutadiene have been reported. The majority of these catalyst systems, however, have no practical utility because they have low catalytic activity or poor stereoselectivity, and in some cases they produce low molecular weight polymers or partially crosslinked polymers unsuitable for commercial use.

Two cobalt-based catalyst systems are known for preparing syndiotactic 1,2-polybutadiene. The first comprises a cobalt compound, a phosphine compound, an organoaluminum compound, and water. This catalyst system yields syndiotactic 1,2-polybutadiene having very low crystallinity. Also, this catalyst system develops sufficient catalytic activity only when halogenated hydrocarbon solvents are used as the polymerization medium, and halogenated solvents present toxicity problems.

The second catalyst system comprises a cobalt compound, an organoaluminum compound, and carbon disulfide. Because carbon disulfide has a low flash point, obnoxious smell, high volatility, and toxicity, it is difficult and dangerous to use and requires expensive safety measures to prevent even minimal amounts escaping into the atmosphere. Furthermore, the syndiotactic 1,2-polybutadiene produced with this cobalt catalyst system has a melting temperature of about 200–210° C., which makes it difficult to process. Although the melting temperature of the syndiotactic 1,2-polybutadiene produced with this cobalt catalyst system can be reduced by employing a catalyst modifier, the use of this catalyst modifier has adverse effects on the catalyst activity and polymer yields.

Coordination catalyst systems based on iron-containing compounds, such as the combination of iron(III) acetylacetonate and triethylaluminum, are known. But, they have very low catalytic activity and poor stereoselectivity for polymerizing conjugated dienes. The product mixture often contains oligomers, low molecular weight liquid polymers, or partially crosslinked polymers. Therefore, these iron-based catalyst systems have no industrial utility.

Because syndiotactic 1,2-polybutadiene is a useful product and the catalysts known heretofore in the art have many shortcomings, it would be advantageous to develop a new and significantly improved catalyst composition that has high catalytic activity and stereoselectivity for polymerizing 1,3-butadiene into syndiotactic 1,2-polybutadiene.

SUMMARY OF THE INVENTION

In general the present invention provides a catalyst composition that is the combination of or the reaction product of ingredients comprising (a) an iron-containing compound, (b) a silyl phosphonate, and (c) an organoaluminum compound.

The present invention also includes a catalyst composition formed by a process comprising the steps of combining (a) a iron-containing compound, (b) a silyl phosphonate, and (c) an organoaluminum compound.

The present invention further includes a process for forming conjugated diene polymers comprising the step of polymerizing conjugated diene monomers in the presence of a catalytically effective amount of a catalyst composition formed by combining (a) a iron-containing compound, (b) a silyl phosphonate, and (c) an organoaluminum compound.

Advantageously, the catalyst composition of the present invention has very high catalytic activity and stereoselectivity for polymerizing 1,3-butadiene into syndiotactic 1,2-polybutadiene. This activity and selectivity, among other advantages, allows syndiotactic 1,2-polybutadiene to be produced in high yields with low catalyst levels after relatively short polymerization times. Significantly, this catalyst composition is very versatile and capable of producing syndiotactic 1,2-polybutadiene with a wide range of melting temperatures without the need for catalyst modifiers, which may have adverse effects on the catalyst activity and polymer yields. In addition, this catalyst composition does not contain carbon disulfide. Therefore, the toxicity, objectionable smell, dangers, and expense associated with the use of carbon disulfide are eliminated. Further, the iron-containing compounds that are utilized are generally stable, inexpensive, relatively innocuous, and readily available. Still further, this catalyst composition has high catalytic activity in a wide variety of solvents including the environmentally-preferred non-halogenated solvents such as aliphatic and cycloaliphatic hydrocarbons.

DETAILED DESCRIPTION OF ILLUSTRATIVE EMBODIMENTS

The catalyst composition is formed by combining (a) an iron-containing compound, (b) a silyl phosphonate, and (c) an organoaluminum compound. In addition to the three catalyst ingredients (a), (b), and (c), other organometallic compounds or Lewis bases can also be added, if desired.

Various iron-containing compounds or mixtures thereof can be employed as ingredient (a) of the catalyst composition. Preferably, these iron-containing compounds are soluble in a hydrocarbon solvent such as aromatic hydrocarbons, aliphatic hydrocarbons, or cycloaliphatic hydrocarbons. Hydrocarbon-insoluble iron-containing compounds, however, can be suspended in the polymerization medium to form the catalytically active species and are also useful.

The iron atom in the iron-containing compounds can be in various oxidation states including but not limited to the 0,+2,+3, and +4 oxidation states. Divalent iron compounds (also called ferrous compounds), wherein the iron atom is in the +2 oxidation state, and trivalent iron compounds (also called ferric compounds), wherein the iron atom is in the +3 oxidation state, are preferred. Suitable iron-containing compounds include, but are not limited to, iron carboxylates, iron organophosphates, iron organophosphonates, iron organophosphinates, iron carbamates, iron dithiocarbamates, iron xanthates, iron β-diketonates, iron alkoxides or aryloxides, and organoiron compounds.

Suitable iron carboxylates include iron(II) formate, iron (III) formate, iron(II) acetate, iron(III) acetate, iron(II) acrylate, iron(III) acrylate, iron(II) methacrylate, iron(III) methacrylate, iron(II) valerate, iron(III) valerate, iron(II) gluconate, iron(III) gluconate, iron(II) citrate, iron(III) citrate, iron(II) fumarate, iron(III) fumarate, iron(II) lactate, iron(III) lactate, iron(II) maleate, iron(III) maleate, iron(II) oxalate, iron(III) oxalate, iron(II) 2-ethylhexanoate, iron(III) 2-ethylhexanoate, iron(II) neodecanoate, iron(III) neodecanoate, iron(II) naphthenate, iron(III) naphthenate, iron(II) stearate, iron(III) stearate, iron(II) oleate, iron(III) oleate, iron(II) benzoate, iron(III) benzoate, iron(II) picolinate, and iron(III) picolinate.

Suitable iron organophosphates include iron(II) dibutyl phosphate, iron(III) dibutyl phosphate, iron(II) dipentyl phosphate, iron(III) dipentyl phosphate, iron (II) dihexyl phosphate, iron (III) dihexyl phosphate, iron (II) diheptyl phosphate, iron (III) diheptyl phosphate, iron (II) dioctyl phosphate, iron(III) dioctyl phosphate, iron(II) bis(1-methylheptyl) phosphate, iron(III) bis(1-methylheptyl) phosphate, iron(II) bis(2-ethylhexyl) phosphate, iron(III) bis(2-ethylhexyl) phosphate, iron(II) didecyl phosphate, iron (III) didecyl phosphate, iron(II) didodecyl phosphate, iron (III) didodecyl phosphate, iron (II) dioctadecyl phosphate, iron(III) dioctadecyl phosphate, iron(II) dioleyl phosphate, iron(III) dioleyl phosphate, iron(II) diphenyl phosphate, iron(III) diphenyl phosphate, iron(II) bis(p-nonylphenyl) phosphate, iron(III) bis(p-nonylphenyl) phosphate, iron(II) butyl (2-ethylhexyl) phosphate, iron(III) butyl (2-ethylhexyl) phosphate, iron(II) (1-methylheptyl) (2-ethylhexyl) phosphate, iron(III) (1-methylheptyl) (2-ethylhexyl) phosphate, iron(II) (2-ethylhexyl) (p-nonylphenyl) phosphate, and iron(III) (2-ethylhexyl) (p-nonylphenyl) phosphate.

Suitable iron organophosphonates include iron(II) butyl phosphonate, iron(III) butyl phosphonate, iron(II) pentyl phosphonate, iron(III) pentyl phosphonate, iron(II) hexyl phosphonate, iron(III) hexyl phosphonate, iron(II) heptyl phosphonate, iron(III) heptyl phosphonate, iron(II) octyl phosphonate, iron(III) octyl phosphonate, iron(II) (1-methylheptyl) phosphonate, iron(III) (1-methylheptyl) phosphonate, iron(II) (2-ethylhexyl) phosphonate, iron(III) (2-ethylhexyl) phosphonate, iron(II) decyl phosphonate, iron(III) decyl phosphonate, iron(II) dodecyl phosphonate, iron(III) dodecyl phosphonate, iron(II) octadecyl phosphonate, iron(III) octadecyl phosphonate, iron(II) oleyl phosphonate, iron(III) oleyl phosphonate, iron(II) phenyl phosphonate, iron(III) phenyl phosphonate, iron(II) (p-nonylphenyl) phosphonate, iron(III) (p-nonylphenyl) phosphonate, iron(II) butyl butylphosphonate, iron(III) butyl butylphosphonate, iron(II) pentyl pentylphosphonate, iron (II) pentyl pentylphosphonate, iron(II) hexyl hexylphosphonate, iron(III) hexyl hexylphosphonate, iron (II) heptyl heptylphosphonate, iron(III) heptyl heptylphosphonate, iron(II) octyl octylphosphonate, iron (III) octyl octylphosphonate, iron(II) (1-methylheptyl) (1-methylheptyl)phosphonate, iron(III) (1-methylheptyl) (1-methylheptyl)phosphonate, iron(II) (2-ethylhexyl) (2-ethylhexyl)phosphonate, iron(III) (2-ethylhexyl) (2-ethylhexyl)phosphonate, iron(II) decyl decylphosphonate, iron(III) decyl decylphosphonate, iron (II) dodecyl dodecylphosphonate, iron(III) dodecyl dodecylphosphonate, iron(II) octadecyl octadecylphosphonate, iron(III) octadecyl octadecylphosphonate, iron(II) oleyl oleylphosphonate, iron (III) oleyl oleylphosphonate, iron(II) phenyl phenylphosphonate, iron(III) phenyl phenylphosphonate, iron(II) (p-nonylphenyl) (p-nonylphenyl)phosphonate, iron (III) (p-nonylphenyl) (p-nonylphenyl)phosphonate, iron(II) butyl (2-ethylhexyl)phosphonate, iron(III) butyl (2-ethylhexyl)phosphonate, iron(II) (2-ethylhexyl) butylphosphonate, iron(III) (2-ethylhexyl) butylphosphonate, iron(II) (1-methylheptyl) (2-ethylhexyl) phosphonate, iron(III) (1-methylheptyl) (2-ethylhexyl) phosphonate, iron(II) (2-ethylhexyl) (1-methylheptyl) phosphonate, iron(III) (2-ethylhexyl) (1-methylheptyl) phosphonate, iron (II) (2-ethylhexyl) (p-nonylphenyl) phosphonate, iron(III) (2-ethylhexyl) (p-nonylphenyl) phosphonate, iron(II) (p-nonylphenyl) (2-ethylhexyl) phosphonate, and iron(III) (p-nonylphenyl) (2-ethylhexyl) phosphonate.

Suitable iron organophosphinates include iron(II) butylphosphinate, iron(III) butylphosphinate, iron(II) pentylphosphinate, iron(III) pentylphosphinate, iron(II) hexylphosphinate, iron(III) hexylphosphinate, iron(II) heptylphosphinate, iron(III) heptylphosphinate, iron(II) octylphosphinate, iron(III) octylphosphinate, iron(II) (1-methylheptyl)phosphinate, iron(III) (1-methylheptyl) phosphinate, iron(II) (2-ethylhexyl)phosphinate, iron(III) (2-ethylhexyl)phosphinate, iron(II) decylphosphinate, iron (III) decylphosphinate, iron(II) dodecylphosphinate, iron (III) dodecylphosphinate, iron(II) octadecylphosphinate, iron(III) octadecylphosphinate, iron(II) oleylphosphinate, iron(III) oleylphosphinate, iron(II) phenylphosphinate, iron (III) phenylphosphinate, iron(II) (p-nonylphenyl) phosphinate, iron(III) (p-nonylphenyl)phosphinate, iron(II) dibutylphosphinate, iron(III) dibutylphosphinate, iron(II) dipentylphosphinate, iron(III) dipentylphosphinate, iron(II) dihexylphosphinate, iron(III) dihexylphosphinate, iron(II) diheptylphosphinate, iron(III) diheptylphosphinate, iron(II) dioctylphosphinate, iron(III) dioctylphosphinate, iron(II) bis (1-methylheptyl)phosphinate, iron (III) bis (1-methylheptyl) phosphinate, iron (II) bis(2-ethylhexyl)phosphinate, iron (III) bis(2-ethylhexyl)phosphinate, iron(II) didecylphosphinate, iron(III) didecylphosphinate, iron(II) didodecylphosphinate, iron(III) didodecylphosphinate, iron (II) dioctadecylphosphinate, iron(III) dioctadecylphosphinate, iron(II) dioleylphosphinate, iron (III) dioleylphosphinate, iron(II) diphenylphosphinate, iron (III) diphenylphosphinate, iron(II) bis(p-nonylphenyl) phosphinate, iron (III) bis (p-nonylphenyl) phosphinate, iron (II) butyl(2-ethylhexyl)phosphinate, iron(III) butyl(2-ethylhexyl)phosphinate, iron(II) (1-methylheptyl) (2-ethylhexyl)phosphinate, iron(III) (1-methylheptyl) (2-ethylhexyl)phosphinate, iron(II) (2-ethylhexyl) (p-nonylphenyl)phosphinate, and iron(III) (2-ethylhexyl) (p-nonylphenyl)phosphinate.

Suitable iron carbamates include iron(II) dimethylcarbamate, iron(III) dimethylcarbamate, iron(II) diethylcarbamate, iron(III) diethylcarbamate, iron(II) diisopropylcarbamate, iron(III) diisopropylcarbamate, iron (II) dibutylcarbamate, iron(III) dibutylcarbamate, iron(II) dibenzylcarbamate, and iron(III) dibenzylcarbamate.

Suitable iron dithiocarbamates include iron (II) dimethyldithiocarbamate, iron(III) dimethyldithiocarbamate, iron(II) diethyldithiocarbamate, iron(III) diethyldithiocarbamate, iron(II) diisopropyldithiocarbamate, iron(III) diisopropyldithiocarbamate, iron(II) dibutyldithiocarbamate, iron(III) dibutyldithiocarbamate, iron(II) dibenzyldithiocarbamate, and iron(III) dibenzyldithiocarbamate.

Suitable iron xanthates include iron(II) methylxanthate, iron(III) methylxanthate, iron(II) ethylxanthate, iron(III) ethylxanthate, iron(II) isopropylxanthate, iron(III) isopropylxanthate, iron(II) butylxanthate, iron(III) butylxanthate, iron(II) benzylxanthate, and iron(III) benzylxanthate.

Suitable iron β-diketonates include iron(II) acetylacetonate, iron(III) acetylacetonate, iron(II) trifluoroacetylacetonate, iron(III) trifluoroacetylacetonate, iron(II) hexafluoroacetylacetonate, iron(III) hexafluoroacetylacetonate, iron(II) benzoylacetonate, iron(III) benzoylacetonate, iron(II) 2,2,6,6-tetramethyl-3,5-heptanedionate, and iron(III) 2,2,6,6-tetramethyl-3,5-heptanedionate.

Suitable iron alkoxides or aryloxides include iron(II) methoxide, iron(III) methoxide, iron(II) ethoxide, iron(III) ethoxide, iron(II) isopropoxide, iron(III) isopropoxide, iron(II) 2-ethylhexoxide, iron(III) 2-ethylhexoxide, iron(II) phenoxide, iron(III) phenoxide, iron(II) nonylphenoxide, iron(III) nonylphenoxide, iron(II) naphthoxide, and iron(III) naphthoxide.

The term "organoiron compound" refers to any iron compound containing at least one covalent iron-carbon bond. Suitable organoiron compounds include bis(cyclopentadienyl)iron(II) (also called ferrocene), bis(pentamethylcyclopentadienyl)iron(II) (also called decamethylferrocene), bis(pentadienyl)iron(II), bis(2,4-dimethylpentadienyl) iron(II), bis(allyl)dicarbonyliron(II), (cyclopentadienyl) (pentadienyl)iron(II), tetra(1-norbornyl) iron(IV), (trimethylenemethane)tricarbonyliron(II), bis(butadiene) carbonyliron (O), butadienetricarbonyliron (O), and bis (cyclooctatetraene) iron (O).

Useful silyl phosphonate compounds that can be employed as ingredient (b) of the catalyst composition include acyclic silyl phosphonates, cyclic silyl phosphonates, and mixtures thereof. Acyclic silyl phosphonates may be represented by the following structure:

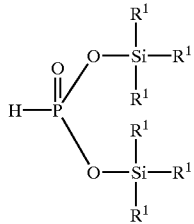

where each $R^1$, which may be the same or different, is a hydrogen atom or a mono-valent organic groups. Preferably, each $R^1$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. The acyclic silyl phosphonates may be associated in dimeric, trimeric or oligomeric forms by hydrogen bonding.

Suitable acyclic silyl phosphonates include bis (trimethylsilyl) phosphonate, bis(dimethylsilyl) phosphonate, bis(triethylsilyl) phosphonate, bis(diethylsilyl) phosphonate, bis(tri-n-propylsilyl) phosphonate, bis(di-n-propylsilyl) phosphonate, bis(triisopropylsilyl) phosphonate, bis(diisopropylsilyl) phosphonate, bis(tri-n-butylsilyl) phosphonate, bis(di-n-butylsilyl) phosphonate, bis(triisobutylsilyl) phosphonate, bis(diisobutylsilyl) phosphonate, bis(tri-t-butylsilyl) phosphonate, bis(di-t-butylsilyl) phosphonate, bis(trihexylsilyl) phosphonate, bis (dihexylsilyl) phosphonate, bis(trioctylsilyl) phosphonate, bis(dioctylsilyl) phosphonate, bis (tricyclohexylsilyl) phosphonate, bis (dicyclohexylsilyl) phosphonate, bis (triphenylsilyl) phosphonate, bis (diphenylsilyl) phosphonate, bis (tri-p-tolylsilyl) phosphonate, bis (di-p-tolylsilyl) phosphonate, bis(tribenzylsilyl) phosphonate, bis (dibenzylsilyl) phosphonate, bis(methyldiethylsilyl) phosphonate, bis(methyldi-n-propylsilyl) phosphonate, bis (methyldiisopropylsilyl) phosphonate, bis(methyldi-n-butylsilyl) phosphonate, bis(methyldiisobutylsilyl) phosphonate, bis(methyldi-t-butylsilyl) phosphonate, bis (methyldiphenylsilyl) phosphonate, bis(dimethylethylsilyl) phosphonate, bis(dimethyl-n-propylsilyl) phosphonate, bis (dimethylisopropylsilyl) phosphonate, bis(dimethyl-n-butylsilyl) phosphonate, bis(dimethylisobutylsilyl) phosphonate, bis(dimethyl-t-butylsilyl) phosphonate, bis (dimethylphenylsilyl) phosphonate, bis(t-butyldiphenylsilyl) phosphonate, bis[tris(2-ethylhexyl)silyl] phosphonate, bis [bis(2-ethylhexyl) silyl] phosphonate, bis [tris(nonylphenyl) silyl] phosphonate, bis [tris (2,4,6-trimethylphenyl) silyl] phosphonate, bis [bis(2,4,6-trimethylphenyl)silyl] phosphonate, bis[tris(4-fluorophenyl) silyl] phosphonate, bis[bis(4-fluorophenyl)silyl] phosphonate, bis[tris(pentafluorophenyl)silyl] phosphonate, bis[tris(trifluoromethyl)silyl] phosphonate, bis[tris(2,2,2-trifluoroethyl) silyl] phosphonate, bis [tris (trimethylsilyl) silyl] phosphonate, bis [tris (trimethylsilylmethyl) silyl] phosphonate, bis [tris (dimethylsilyl) silyl] phosphonate, bis[tris(2-butoxyethyl)silyl] phosphonate, bis (trimethoxysilyl) phosphonate, bis(triethoxysilyl) phosphonate, bis(triphenoxysilyl) phosphonate, bis [tris (trimethylsilyloxy) silyl] phosphonate, bis [tris (dimethylsilyloxy) silyl] phosphonate, or mixtures thereof.

Cyclic silyl phosphonates contain a ring structure that is formed by joining the two silicon atoms together or by bridging the two silicon atoms with one or more divalent organic groups. These cyclic silyl phosphonates may be represented by the following structure:

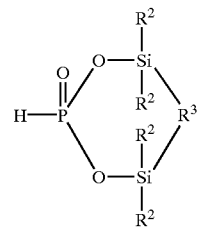

where each $R^2$, which may be the same or different, is a hydrogen atom or a mono-valent organic group, and $R^3$ is a bond between the silicon atoms or a divalent organic group. Bicyclic silyl phosphonates may be formed by joining two $R^2$ groups, and therefore the term cyclic silyl phosphonate will include to multi-cyclic silyl phosphonates. Preferably, each $R^2$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, $R^3$ is a hydrocarbylene group such as, but not limited to, alkylene, substituted alkylene, cycloalkylene, substituted cycloalkylene, alkenylene, substituted alkenylene, cycloalkenylene, substituted cycloalkenylene, arylene, and substituted arylene groups, with each group preferably containing from 1 carbon atom, or the appropriate minimum number of carbon atoms to form the group, up to about 20 carbon atoms. These hydrocarbylene groups may contain heteroatoms such as, but not limited to, nitrogen, oxygen, silicon, sulfur, and phosphorus atoms. The cyclic silyl phosphonates may be associated in dimeric, trimeric or oligomeric forms by hydrogen bonding.

Suitable cyclic silyl phosphonates include 2-oxo-(2H)-4,5-disila-1,3,2-dioxaphospholane, 2-oxo-(2H)-4,5-disila-4,4,5,5-tetramethyl-1,3,2-dioxaphospholane, 2-oxo-(2H)-4,5-disila-4,4,5,5-tetraethyl-1,3,2-deoxaphospholane, 2-oxo-(2H)-4,5-disila-4,4,5,5-tetraphenyl-1,3,2-dioxaphospholane, 2-oxo-(2H)-4,5-disila-4,4,5,5-tetrabenzyl-1,3,2-dioxaphospholane, 2-oxo-(2H)-4,5-disila-4,5-dimethyl-1,3,2-dioxaphospholane, 2-oxo-(2H)-4,5-disila-4,5-diethyl-1,3,2-dioxaphospholane, 2-oxo-(2H)-4,5-disila-4,5-diphenyl-1,3,2-dioxaphospholane, 2-oxo-(2H)-4,5-disila-4,5-dibenzyl-1,3,2-dioxaphospholane, 2-oxo-(2H)-4.5-disila-4-methyl-1,3,2-dioxaphospholane, 2-oxo-(2H)-4,6-disila-1,3,2-dioxaphosphorinane, 2-oxo-(2H)-4,6-disila-4,4,6,6-tetramethyl-1,3,2-dioxaphosphorinane, 2-oxo-(2H)-4,6-disila-4,4,6,6-tetraethyl-1,3,2-dioxaphosphorinane, 2-oxo-(2H)-4,6-disila-4,4,6,6-tetraphenyl-1,3,2-dioxaphosphorinane, 2-oxo-(2H)-4,6-disila-4,4,6,6-tetrabenzyl-1,3,2-dioxaphosphorinane, 2-oxo-(2H)-4,6-disila-4,6-dimethyl-1,3,2-dioxaphosphorinane, 2-oxo-(2H)-4,6-disila-4,6-diethyl-1,3,2-dioxaphosphorinane, 2-oxo-(2H)-4,6-disila-4,6-diphenyl-1,3,2-dioxaphosphorinane, 2-oxo-(2H)-4,6-disila-4,6-dibenzyl-1,3,2-dioxaphosphorinane, 2-oxo-(2H)-4,6-disila-5,5-dimethyl-1,3,2-dioxaphosphorinane, 2-oxo-(2H)-4,6-disila-5,5-diethyl-1,3,2-dioxaphosphorinane, 2-oxo-(2H)-4,6-disila-5,5-diphenyl-1,3,2-dioxaphosphorinane, 2-oxo-(2H)-4,6-disila-5,5-dibenzyl-1,3,2-dioxaphosphorinane, 2-oxo-(2H)-4,6-disila-5-ethyl-5-methyl-1,3,2-dioxaphosphorinane, 2-oxo-(2H)-4,6-disila-5-methyl-5-propyl-1,3,2-dioxaphosphorinane, 2-oxo-(2H)-4,6-disila-5-butyl-5-ethyl-1,3,2-dioxaphosphorinane, 2-oxo-(2H)-4,6-disila-4-isopropyl-5,5-dimethyl-1,3,2-dioxaphosphorinane, 2-oxo-(2H)-4,6-disila-4-propyl-5-ethyl-1,3,2-dioxaphosphorinane, 2-oxo-(2H)-4,6-disila-4-methyl-1,3,2-dioxaphosphorinane, or mixtures thereof.

Various organoaluminum compounds or mixtures thereof can be used as ingredient (c) of the catalyst composition. The term "organoaluminum compound" refers to any aluminum compound containing at least one covalent aluminum-carbon bond. Organoaluminum compounds that are soluble in a hydrocarbon solvent are preferred. Preferably, halogen-containing organoaluminum compounds containing aluminum-halogen bonds and those containing labile carbon-halogen bonds should be avoided.

A preferred class of organoaluminum compounds is represented by the general formula $AlR_nX_{3-n}$, where each R, which may be the same or different, is a mono-valent organic group that is attached to the aluminum atom via a carbon atom, where each X, which may be the same or different, is a hydrogen atom, a carboxylate group, an alkoxide group, or an aryloxide group, and where n is an integer of 1 to 3. Preferably, each R is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about 20 carbon atoms. These hydrocarbyl groups may contain heteroatoms such as, but not limited to, nitrogen, oxygen, silicon, sulfur, and phosphorus atoms. Preferably, each X is a carboxylate group, an alkoxide group, or an aryloxide group, with each group preferably containing from 1 carbon atom, or the appropriate minimum number of carbon atoms to form the group, up to about 20 carbon atoms.

Suitable organoaluminum compounds include, but are not limited to, trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum aryloxide, hydrocarbylaluminum diaryloxide, and the like, and mixtures thereof. Trihydrocarbylaluminum compounds are generally preferred.

Specific organoaluminum compounds include trimethylaluminum, triethylaluminum, triisobutylaluminum, tri-n-propylaluminum, triisopropylaluminum, tri-n-butylaluminum, tri-t-butylaluminum, tri-n-pentylaluminum, trineopentylaluminum, tri-n-hexylaluminum, tri-n-octylaluminum, tris(2-ethylhexyl)aluminum, tricyclohexylaluminum, tris(1-methylcyclopentyl) aluminum, triphenylaluminum, tri-p-tolylaluminum, tris (2,6-dimethylphenyl) aluminum, tribenzylaluminum, diethylphenylaluminum, diethyl-p-tolylaluminum, diethylbenzylaluminum, ethyldiphenylaluminum, ethyldi-p-tolylaluminum, ethyldibenzylaluminum, diethylaluminum hydride, di-n-propylaluminum hydride, diisopropylaluminum hydride, di-n-butylaluminum hydride, diisobutylaluminum hydride, di-n-octylaluminum hydride, diphenylaluminum hydride, di-p-tolylaluminum hydride, dibenzylaluminum hydride, phenylethylaluminum hydride, phenyl-n-propylaluminum hydride, phenylisopropylaluminum hydride, phenyl-n-butylaluminum hydride, phenylisobutylaluminum hydride, phenyl-n-octylaluminum hydride, p-tolylethylaluminum hydride, p-tolyl-n-propylaluminum hydride, p-tolylisopropylaluminum hydride, p-tolyl-n-butylaluminum hydride, p-tolylisobutylaluminum hydride, p-tolyl-n-octylaluminum hydride, benzylethylaluminum hydride, benzyl-n-propylaluminum hydride, benzylisopropylaluminum hydride, benzyl-n-butylaluminum hydride, benzylisobutylaluminum hydride, and benzyl-n-octylaluminum hydride, ethylaluminum dihydride, n-propylaluminum dihydride, isopropylaluminum dihydride, n-butylaluminum dihydride, isobutylaluminum dihydride, n-octylaluminum dihydride, dimethylaluminum hexanoate, diethylaluminum octoate, diisobutylaluminum 2-ethylhexanoate, dimethylaluminum neodecanoate, diethylaluminum stearate, diisobutylaluminum oleate, methylaluminum bis(hexanoate), ethylaluminum bis(octoate), isobutylaluminum bis(2-ethylhexanoate), methylaluminum bis(neodecanoate), ethylaluminum bis (stearate), isobutylaluminum bis(oleate), dimethylaluminum methoxide, diethylaluminum methoxide, diisobutylaluminum methoxide, dimethylaluminum ethoxide, diethylaluminum ethoxide, diisobutylaluminum ethoxide, dimethylaluminum phenoxide, diethylaluminum phenoxide, diisobutylaluminum phenoxide, methylaluminum dimethoxide, ethylaluminum dimethoxide, isobutylaluminum dimethoxide, methylaluminum diethoxide, ethylaluminum diethoxide, isobutylaluminum diethoxide, methylaluminum diphenoxide, ethylaluminum diphenoxide, isobutylaluminum diphenoxide, and the like, and mixtures thereof.

Another class of organoaluminum compounds is aluminoxanes. Aluminoxanes are known in the art and comprise oligomeric linear aluminoxanes that can be represented by the general formula:

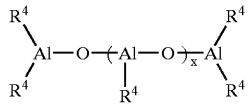

and oligomeric cyclic aluminoxanes that can be represented by the general formula:

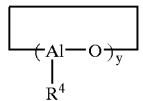

where x is an integer of 1 to about 100, preferably about 10 to about 50; y is an integer of 2 to about 100, preferably about 3 to about 20; where each $R^4$, which may be the same or different, is a mono-valent organic group that is attached to the aluminum atom via a carbon atom. Preferably, each $R^4$ is a hydrocarbyl group such as, but not limited to, alkyl, cycloalkyl, substituted cycloalkyl, alkenyl, cycloalkenyl, substituted cycloalkenyl, aryl, substituted aryl, aralkyl, alkaryl, allyl, and alkynyl groups, with each group preferably containing from 1 carbon atom, or the appropriate minimum number of carbon atoms to form the group, up to about carbon atoms. These hydrocarbyl groups may contain heteroatoms such as, but not limited to, nitrogen, oxygen, silicon, sulfur, and phosphorus atoms. It should be noted that the number of moles of the aluminoxane as used in this application refers to the number of moles of the aluminum atoms rather than the number of moles of the oligomeric aluminoxane molecules. This convention is commonly employed in the art of catalysis utilizing aluminoxanes.

Aluminoxanes can be prepared by reacting trihydrocarbylaluminum compounds with water. This reaction can be performed according to known methods, such as (1) a method in which the trihydrocarbylaluminum compound is dissolved in an organic solvent and then contacted with water, (2) a method in which the trihydrocarbylaluminum compound is reacted with water of crystallization contained in, for example, metal salts, or water adsorbed in inorganic or organic compounds, and (3) a method in which the trihydrocarbylaluminum compound is reacted with water in the presence of the monomer or monomer solution that is to be polymerized.

Suitable aluminoxane compounds include methylaluminoxane (MAO), modified methylaluminoxane (MMAO), ethylaluminoxane, n-propylaluminoxane, isopropylaluminoxane, butylaluminoxane, isobutylaluminoxane, n-pentylaluminoxane, neopentylaluminoxane, n-hexylaluminoxane, n-octylaluminoxane, 2-ethylhexylaluminoxane, cylcohexylaluminoxane, 1-methylcyclopentylaluminoxane, phenylaluminoxane, 2,6-dimethylphenylaluminoxane, and the like, and mixtures thereof. Isobutylaluminoxane is particularly useful on the grounds of its availability and its solubility in aliphatic and cycloaliphatic hydrocarbon solvents. Modified methylaluminoxane can be formed by substituting about 20–80% of the methyl groups of methylaluminoxane with $C_2$ to $C_{12}$ hydrocarbyl groups, preferably with isobutyl groups, by using techniques known to those skilled in the art.

The catalyst composition of this invention has very high catalytic activity for polymerizing conjugated dienes, such as 1,3-butadiene, into polymer, such as syndiotactic 1,2-polybutadiene, over a wide range of catalyst concentrations and catalyst ingredient ratios. The polymers having the most desirable properties, however, are obtained within a narrower range of catalyst concentrations and catalyst ingredient ratios. Further, it is believe that the three catalyst ingredients (a), (b), and (c) may interact to form an active catalyst species. Accordingly, the optimum concentration for any one catalyst ingredient is dependent upon the concentrations of the other catalyst ingredients. The molar ratio of the silyl phosphonate to the iron-containing compound (P/Fe) can be varied from about 0.5:1 to about 50:1, more preferably from about 1:1 to about 25:1, and even more preferably from about 2:1 to about 10:1. The molar ratio of the organoaluminum compound to the iron-containing compound (Al/Fe) can be varied from about 1:1 to about 200:1, more preferably from about 2:1 to about 100:1, and even more preferably from about 3:1 to about 50:1.

The catalyst composition is formed by combining or mixing the three catalyst ingredients (a), (b), and (c). Although an active catalyst species is believed to result from this combination, the degree of interaction or reaction between the various ingredients or components is not known with any great degree of certainty. Therefore, the term "catalyst composition" encompasses a simple mixture of the ingredients, a complex of the various ingredients that is caused by physical or chemical forces of attraction, a chemical reaction product of the ingredients, or a combination of the foregoing.

The catalyst composition may be formed in situ by adding the three catalyst ingredients to a solution containing monomer and solvent, or simply bulk monomer, in either a stepwise or simultaneous manner. When adding the catalyst ingredients in a stepwise manner, the sequence in which the catalyst ingredients are added is not critical. Preferably, however, the iron-containing compound is added first, followed by the silyl phosphonate, and then followed by the organoaluminum compound.

The three catalyst ingredients may be pre-mixed outside the polymerization system at an appropriate temperature, which is generally from about −20° C. to about 80° C., and the resulting catalyst composition is then added to the monomer solution.

The catalyst composition maybe pre-formed in the presence of monomer such as 1,3-butadiene. That is, the three catalyst ingredients are pre-mixed in the presence of a small amount of 1,3-butadiene monomer at an appropriate temperature, which is generally from about −20° C to about 80° C. The amount of 1,3-butadiene monomer that is used for pre-forming the catalyst can range from about 1 to about 500 moles per mole of the iron-containing compound, more preferably from about 5 to about 250 moles per mole of the iron-containing compound, and even more preferably from about 10 to about 100 moles per mole of the iron-containing compound. The resulting catalyst composition is then added to the remainder of the 1,3-butadiene monomer that is to be polymerized.

The catalyst composition may be formed by using a two-stage procedure. The first stage involves reacting the iron-containing compound with the organoaluminum compound in the presence of a small amount of 1,3-butadiene monomer at an appropriate temperature, which is generally from about −20° C. to about 80° C. In the second stage, the foregoing reaction mixture and the silyl phosphonate are charged in either a stepwise or simultaneous manner to the remainder of the 1,3-butadiene monomer that is to be polymerized.

An alternative two-stage procedure may also be employed. An iron-ligand complex is first formed by pre-combining the iron-containing compound with the silyl phosphonate. Once formed, this iron-ligand complex is then combined with the organoaluminum compound to form the active catalyst species. The iron-ligand complex can be formed separately or in the presence of the 1,3-butadiene monomer that is to be polymerized. This complexation reaction can be conducted at any convenient temperature at normal pressure, but for an increased rate of reaction, it is preferable to perform this reaction at room temperature or above. The time required for the formation of the iron-ligand complex is usually within the range of about 10 minutes to about 2 hours after mixing the iron-containing compound with the silyl phosphonate. The temperature and time used for the formation of the iron-ligand complex will depend upon several variables including the particular starting materials and the solvent employed. Once formed, the iron-ligand complex can be used without isolation from the complexation reaction mixture. If desired, however, the iron-ligand complex may be isolated from the complexation reaction mixture before use.

When a solution of the catalyst composition or one or more of the catalyst ingredients is prepared outside the polymerization system as set forth in the foregoing methods, an organic solvent or carrier is preferably employed. The organic solvent may serve to dissolve the catalyst composition or ingredients, or the solvent may simply serve as a carrier in which the catalyst composition or ingredients may be suspended. Desirably, an organic solvent that is inert with respect to the catalyst composition is used. Preferably, halogenated solvents that contain labile carbon-halogen bonds should be avoided. Useful solvents include hydrocarbon solvents such as aromatic hydrocarbons, aliphatic hydrocarbons, and cycloaliphatic hydrocarbons. Non-limiting examples of aromatic hydrocarbon solvents include benzene, toluene, xylenes, ethylbenzene, diethylbenzene, mesitylene, and the like. Non-limiting examples of aliphatic hydrocarbon solvents include n-pentane, n-hexane, n-heptane, n-octane, n-nonane, n-decane, isopentane, isohexanes, isopentanes, isooctanes, 2,2-dimethylbutane, petroleum ether, kerosene, petroleum spirits, and the like. And, non-limiting examples of cycloaliphatic hydrocarbon solvents include cyclopentane, cyclohexane, methylcyclopentane, methylcyclohexane, and the like. Commercial mixtures of the above hydrocarbons may also be used. For environmental reasons, aliphatic and cycloaliphatic solvents are highly preferred.

The catalyst composition of this invention exhibits very high catalytic activity for the polymerization of 1,3-butadiene into syndiotactic 1,2-polybutadiene. Although one embodiment is directed toward the polymerization of 1,3-butadiene into syndiotactic 1,2-polybutadiene, other conjugated dienes can also be polymerized by using the catalyst composition. Examples of conjugated dienes that can be polymerized include isoprene, 1,3-pentadiene, 1,3-hexadiene, 2,3-dimethyl-1,3-butadiene, 2-ethyl-1,3-butadiene, 2-methyl-1,3-pentadiene, 3-methyl-1,3-pentadiene, 4-methyl-1, 3-pentadiene, and 2,4-hexadiene. Mixtures of two or more conjugated dienes may also be utilized in copolymerization.

The production of syndiotactic 1,2-polybutadiene is accomplished by polymerizing 1,3-butadiene in the presence of a catalytically effective amount of the foregoing catalyst composition. The total catalyst concentration to be employed in the polymerization mass depends on the interplay of various factors such as the purity of the ingredients, the polymerization temperature, the polymerization rate and conversion desired, and many other factors. Accordingly, a specific total catalyst concentration cannot be definitively set forth except to say that catalytically effective amounts of the respective catalyst ingredients should be used. Generally, the amount of the iron-containing compound used can be varied from about 0.01 to about 2 mmol per 100 g of 1,3-butadiene monomer, more preferably from about 0.02 to about 1.0 mmol per 100 g of 1,3-butadiene monomer, and even more preferably from about 0.05 to about 0.5 mmol per 100 g of 1,3-butadiene monomer.

The polymerization of 1,3-butadiene is preferably carried out in an organic solvent as the diluent. Accordingly, a solution polymerization system may be employed in which both the 1,3-butadiene monomer to be polymerized and the polymer formed are soluble in the polymerization medium. Alternatively, a precipitation polymerization system may be employed by choosing a solvent in which the polymer formed is insoluble. In both cases, an amount of organic solvent in addition to the amount of organic solvent that may be used in preparing the catalyst composition is usually added to the polymerization system. The additional organic solvent may be the same as or different from the organic solvent used in preparing the catalyst composition. Desirably, an organic solvent that is inert with respect to the catalyst composition employed to catalyze the polymerization is selected. Exemplary hydrocarbon solvents have been set forth above. When a solvent is employed, the concentration of the 1,3-butadiene monomer to be polymerized is not limited to a special range. Preferably, however, the concentration of the 1,3-butadiene monomer present in the polymerization medium at the beginning of the polymerization should be in a range of from about 3% to about 80% by weight, more preferably from about 5% to about 50% by weight, and even more preferably from about 10% to about 30% by weight.

The polymerization of 1,3-butadiene may also be carried out by means of bulk polymerization, which refers to a polymerization environment where no solvents are employed. The bulk polymerization can be conducted either in a condensed liquid phase or in a gas phase.

In performing the polymerization of 1,3-butadiene, a molecular weight regulator may be employed to control the molecular weight of the syndiotactic 1,2-polybutadiene to be produced. As a result, the scope of the polymerization system can be expanded in such a manner that it can be used for the production of syndiotactic 1,2-polybutadiene having a wide range of molecular weights. Suitable types of molecular weight regulators include, but are not limited to, β-olefins such as ethylene, propylene, 1-butene, 1-pentene, 1-hexene, 1-heptene, and 1-octene; accumulated diolefins such as allene and 1,2-butadiene; nonconjugated diolefins such as 1,6-octadiene, 5-methyl-1,4-hexadiene, 1,5-cyclooctadiene, 3,7-dimethyl-1,6-octadiene, 1,4-cyclohexadiene, 4-vinylcyclohexene, 1,4-pentadiene, 1,4-hexadiene, 1,5-hexadiene, 1,6-heptadiene, 1,2-divinylcyclohexane, 5-ethylidene-2-norbornene, 5-methylene-2-norbornene, 5-vinyl-2-norbornene, dicyclopentadiene, and 1,2,4-trivinylcyclohexane; acetylenes such as acetylene, methylacetylene, and vinylacetylene; and mixtures thereof. The amount of the molecular weight regulator used, expressed in parts per hundred parts by weight of the 1,3-butadiene monomer (phm), is from about 0.01 to about 10 phm, preferably from about 0.02 to about 2 phm, and more preferably from about 0.05 to about 1 phm.

The molecular weight of the syndiotactic 1,2-polybutadiene to be produced can also be effectively controlled by conducting the polymerization of 1,3-butadiene monomer in the presence of hydrogen gas. In this case, the partial pressure of hydrogen gas is preferably from about 0.01 to about 50 atmospheres.

The polymerization of 1,3-butadiene may be carried out as a batch process, a continuous process, or a semi-continuous process. In the semi-continuous process, 1,3-butadiene monomer is intermittently charged as needed to replace that monomer already polymerized. In any case, the polymerization is preferably conducted under anaerobic conditions by using an inert protective gas such as nitrogen, argon or helium, with moderate to vigorous agitation. The polymerization temperature may vary widely from a low temperature, such as −10° C. or below, to a high temperature such as 100° C. or above, with a preferred temperature range being from about 20° C. to about 90° C. The heat of polymerization may be removed by external cooling, cooling by evaporation of the 1,3-butadiene monomer or the solvent, or a combination of the two methods. Although the polymerization pressure employed may vary widely, a preferred pressure range is from about 1 atmosphere to about 10 atmospheres.

Once a desired conversion is achieved, the polymerization can be stopped by adding a polymerization terminator that inactivates the catalyst. Typically, the terminator employed is a protic compound, which includes, but is not limited to, an alcohol, a carboxylic acid, an inorganic acid, water, or a mixture thereof. An antioxidant such as 2,6-di-tert-butyl-4-methylphenol may be added along with, before or after the addition of the terminator. The amount of the antioxidant employed is usually in the range of 0.2% to 1% by weight of the polymer product. When the polymerization has been stopped, the syndiotactic 1,2-polybutadiene product can be recovered from the polymerization mixture by utilizing conventional procedures of desolventization and drying. For instance, the syndiotactic 1,2-polybutadiene may be isolated from the polymerization mixture by coagulation of the polymerization mixture with an alcohol such as methanol, ethanol, or isopropanol, or by steam distillation of the solvent and the unreacted 1,3-butadiene monomer, followed by filtration. The polymer product is then dried to remove residual amounts of solvent and water.

Advantageously, the iron-based catalyst composition of this invention can be manipulated to vary the characteristics of the resulting syndiotactic 1,2-polybutadiene. Namely, the syndiotactic 1,2-polybutadiene can have various melting temperatures, molecular weights, 1,2-linkage contents, and syndiotacticities, all of which are dependent upon the selection of the catalyst ingredients and the ingredient ratios. For example, it has been found that the melting temperature, molecular weight, 1,2-linkage content, and syndiotacticity of the syndiotactic 1,2-polybutadiene can be increased by synthesizing the polymer with the catalyst composition of this invention wherein the organoaluminum compound employed contains sterically bulky organic groups in lieu of sterically less bulky organic groups. Likewise, the melting temperature, 1,2-linkage content, and syndiotacticity of the syndiotactic 1,2-polybutadiene can also be increased by synthesizing the polymer with the catalyst composition of this invention wherein the two silicon atoms of the silyl phosphonate employed are bonded to sterically bulky organic groups in lieu of sterically less bulky organic groups. Non-limiting examples of sterically bulky organic groups include isopropyl, isobutyl, t-butyl, neopentyl, 2-ethylhexyl, cyclohexyl, 1-methylcyclopentyl, and 2,6-dimethylphenyl groups. Non-limiting examples of sterically less bulky organic groups include methyl, fluoromethyl, ethyl, n-propyl, n-butyl, n-pentyl, n-hexyl, and n-octyl groups.

In one embodiment, syndiotactic 1,2-polybutadiene having a melting temperature from about 110° C. to about 210° C., more advantageously from about 120° C. to about 200° C., and even more advantageously from about 130° to about 190° C., can be prepared. The 1,2-linkage content of the syndiotactic 1,2-polybutadiene is preferably from about 60% to about 99%, and more preferably from about 70% to about 95%. The syndiotacticity of the syndiotactic 1,2-polybutadiene is preferably from about 60% to about 99%, more preferably from about 70% to about 95%, and even more preferably from about 75% to 90%.

The syndiotactic 1,2-polybutadiene has many uses. It can be blended into and cocured with various natural or synthetic rubbers in order to improve the properties thereof. For example, it can be incorporated into elastomers in order to improve the green strength of those elastomers, particularly in tires. The supporting or reinforcing carcass of tires is particularly prone to distortion during tire building and curing procedures. For this reason, the incorporation of the syndiotactic 1,2-polybutadiene into rubber compositions that are utilized in the supporting carcass of tires has particular utility in preventing or minimizing this distortion. In addition, the incorporation of the syndiotactic 1,2-polybutadiene into tire tread compositions can reduce the heat build-up and improve the tear and wear resistance of tire treads. The syndiotactic 1,2-polybutadiene is also useful in the manufacture of films and packaging materials and in many molding applications.

In order to demonstrate the practice of the present invention, the following examples have been prepared and tested. The examples should not, however, be viewed as limiting the scope of the invention. The claims will serve to define the invention.

EXAMPLES

Example 1

Bis(trimethylsilyl) phosphonate (formula: $HP(O)(OSiMe_3)_2$) was synthesized by reacting anhydrous phosphorous acid ($H_3PO_3$) with hexamethyldisiloxane ($Me_3SiOSiMe_3$) in the presence of anhydrous zinc chloride as the catalyst.

Anhydrous phosphorous acid (33.1 g, 0.404 mol), hexamethyldisiloxane (98.4 g, 0.606 mol), anhydrous zinc chloride (2.0 g, 0.015 mol), and benzene (240 mL) were mixed in a round-bottom reaction flask that was connected to a Dean-Stark trap and a reflux condenser. The mixture was heated to reflux for 24 hours, with continuous removal of water via the Dean-Stark trap. The reaction flask was then connected to a distillation head and a receiving flask. The benzene solvent and the unreacted hexamethyldisiloxane were removed by distillation at atmospheric pressure. The remaining crude product was distilled under vacuum, yielding bis(trimethylsilyl) phosphonate as a colorless liquid (51.7 g, 0.228 mol, 57% yield). The identity of the product was established by nuclear magnetic resonance (NMR) spectroscopy. $^1H$ NMR data ($CDCl_3$, 25° C., referenced to tetramethylsilane): δ6.85 (doublet, $^1J_{HP}$=699 Hz, 1 H, H-P), 0.31 (singlet, 18 H, CH$_3$). $^{13}$p NMR data (CDCl$_3$, 25° C., referenced to external 85% H$_3$PO$_4$): −14.2 (doublet, $^1J_{HP}$=698 Hz).

Example 2

Bis(triethylsilyl) phosphonate (formula: HP(O)(OSiEt$_3$)$_2$) was synthesized by reacting anhydrous phosphorous acid (H$_3$PO$_3$) with hexaethyldisiloxane (Et$_3$SiOSiEt$_3$) in the presence of anhydrous zinc chloride as the catalyst.

Anhydrous phosphorous acid (22.1 g, 0.269 mol), hexaethyldisiloxane (99.5 g, 0.404 mol), anhydrous zinc chloride (1.33 g, 0.010 mol), and toluene (230 mL) were mixed in a round-bottom reaction flask that was connected to a Dean-Stark trap and a reflux condenser. The mixture was heated to reflux for 29 hours, with continuous removal of water via the Dean-Stark trap. The reaction flask was then connected to a distillation head and a receiving flask. The toluene solvent and the unreacted hexaethyldisiloxane were removed by distillation at atmospheric pressure. The remaining crude product was distilled under vacuum, yielding bis(triethylsilyl) phosphonate as a colorless liquid (67.9 g, 0.219 mol, 81% yield). The identity of the product was established by nuclear magnetic resonance (NMR) spectroscopy. $^1$H NMR data (CDCl$_3$, 25° C., referenced to tetramethylsilane): δ6.92 (doublet, $^1J_{HP}$=695 Hz, 1 H, H-P), 1.01 (triplet, $^3J_{HH}$=7.4, 18 H, CH$_3$), 0.76 (quartet, $^3J_{HH}$=7.4, 12 H, CH$_2$). $^{13}$p NMR data (CDCl$_3$, 25° C., referenced to external 85% H$_3$PO$_4$): δ−14.5 (doublet, $^1J_{HP}$=695 Hz).

Example 3

An oven-dried 1-liter glass bottle was capped with a self-sealing rubber liner and a perforated metal cap. After the bottle was thoroughly purged with a stream of dry nitrogen gas, the bottle was charged with 236 g of a 1,3-butadiene/hexanes blend containing 21.2% by weight of 1,3-butadiene. The following catalyst ingredients were then added to the bottle in the following order: (1) 0.050 mmol of iron (II) 2-ethylhexanoate, (2) 0.20 mmol of bis(trimethylsilyl) phosphonate, and (3) 0.25 mmol of triethylaluminum. The bottle was tumbled for 6 hours in a water bath maintained at 65° C. The polymerization was terminated by addition of 10 mL of isopropanol containing 1.0 g of 2,6-di-tert-butyl-4-methylphenol. The polymerization mixture was coagulated with 3 liters of isopropanol. The resulting syndiotactic 1,2-polybutadiene was isolated by filtration and dried to a constant weight under vacuum at 60° C. The yield of the polymer was 47.6 g (95% yield). As measured by differential scanning calorimetry (DSC), the polymer had a melting temperature of 160° C. The $^1$H and $^{13}$C nuclear magnetic resonance (NMR) analysis of the polymer indicated a 1,2-linkage content of 88.5% and a syndiotacticity of 81.0%. As determined by gel permeation chromatography (GPC), the polymer had a weight average molecular weight (Mw) of 601,000, a number average molecular weight (M$_n$) of 286,000, and a polydispersity index (M$_w$/M$_n$) of 2.1. The monomer charge, the amounts of the catalyst ingredients, and the properties of the resulting syndiotactic 1,2-polybutadiene are summarized in Table I.

TABLE I

| Example No. | 3 | 4 | 5 |
|---|---|---|---|
| 21.2% 1,3-Bd/hexanes (g) | 236 | 236 | 236 |
| Fe(2-EHA)$_2$ (mmol) | 0.050 | 0.050 | 0.050 |
| HP(O)(OSiMe$_3$)$_2$ (mmol) | 0.20 | 0.20 | 0.20 |
| AlEt$_3$ (mmol) | 0.25 | 0.20 | 0.30 |
| Fe/P/Al molar ratio | 1:4:5 | 1:4:4 | 1:4:6 |
| Polymer yield (%) after 6 hr at 65° C. | 95 | 94 | 92 |
| Melting temperature (° C.) | 160 | 159 | 160 |
| M$_w$ | 601,000 | 594,000 | 618,000 |
| M$_n$ | 286,000 | 258,000 | 281,000 |
| M$_w$/M$_n$ | 2.1 | 2.3 | 2.2 |

Examples 4 and 5

In Examples 4 and 5, the procedure described in Example 3 was repeated except that the catalyst ingredient ratio was varied as shown in Table I. The monomer charge, the amounts of the catalyst ingredients, and the properties of the resulting syndiotactic 1,2-polybutadiene are summarized in Table I.

Examples 6–8

In Examples 6–8, the procedure described in Example 3 was repeated except that tri-n-butylaluminum was substituted for triethylaluminum, and the catalyst ingredient ratio was varied as shown in Table II. The monomer charge, the amounts of the catalyst ingredients, and the properties of the resulting syndiotactic 1,2-polybutadiene are summarized in Table II.

TABLE II

| Example No. | 6 | 7 | 8 |
|---|---|---|---|
| 21.2% 1,3-Bd/hexanes (g) | 236 | 236 | 236 |
| Fe(2-EHA)$_2$ (mmol) | 0.050 | 0.050 | 0.050 |
| HP(O)(OSiMe$_3$)$_2$ (mmol) | 0.20 | 0.20 | 0.20 |
| n-Bu$_3$Al(mmol) | 0.20 | 0.25 | 0.30 |
| Fe/P/Al molar ratio | 1:4:4 | 1:4:5 | 1:4:6 |
| Polymer yield (%) after 6 hr at 65° C. | 94 | 93 | 92 |
| Melting temperature (° C.) | 160 | 161 | 160 |
| M$_w$ | 575,000 | 593,000 | 585,000 |
| M$_n$ | 261,000 | 296,000 | 279,000 |
| M$_w$/M$_n$ | 2.2 | 2.0 | 2.1 |

Examples 9–11

In Examples 9–11, the procedure described in Example 3 was repeated except that triisobutylaluminum was substituted for triethylaluminum, and the catalyst ingredient ratio was varied as shown in Table III. The monomer charge, the amounts of the catalyst ingredients, and the properties of the resulting syndiotactic 1,2-polybutadiene are summarized in Table III.

TABLE III

| Example No. | 9 | 10 | 11 |
|---|---|---|---|
| 21.2% 1,3-Bd/hexanes (g) | 236 | 236 | 236 |
| Fe(2-EHA)$_2$ (mmol) | 0.050 | 0.050 | 0.050 |
| HP(O)(OSiMe$_3$)$_2$ (mmol) | 0.20 | 0.20 | 0.20 |
| i-Bu$_3$Al(mmol) | 0.25 | 0.30 | 0.35 |
| Fe/P/Al molar ratio | 1:4:5 | 1:4:6 | 1:4:7 |
| Polymer yield (%) after 6 hr at 65° C. | 93 | 92 | 92 |
| Melting temperature (° C.) | 176 | 176 | 176 |

TABLE III-continued

| Example No. | 9 | 10 | 11 |
|---|---|---|---|
| $M_w$ | 825,000 | 857,000 | 875,000 |
| $M_n$ | 409,000 | 444,000 | 460,000 |
| $M_w/M_n$ | 2.0 | 1.9 | 1.9 |

Examples 12–14

In Examples 12–14, the procedure described in Example 3 was repeated except that bis(triethylsilyl) phosphonate was substituted for bis(trimethylsilyl) phosphonate, triisobutylaluminum was substituted for triethylaluminum, and the catalyst ingredient ratio was varied as shown in Table IV. The monomer charge, the amounts of the catalyst ingredients, and the properties of the resulting syndiotactic 1,2-polybutadiene are summarized in Table IV. The $^1$H and $^{13}$C NMR analysis of the polymer produced in Example 13 indicated a 1,2-linkage content of 96.4% and a syndiotacticity of 90.5%.

TABLE IV

| Example No. | 12 | 13 | 14 |
|---|---|---|---|
| 21.2% 1,3-Bd/hexanes (g) | 236 | 236 | 236 |
| Fe(2-EHA)$_2$ (mmol) | 0.050 | 0.050 | 0.050 |
| HP(O)(OSiEt$_3$)$_2$ (mmol) | 0.20 | 0.20 | 0.20 |
| i-Bu$_3$Al(mmol) | 0.35 | 0.40 | 0.45 |
| Fe/P/Al molar ratio | 1:4:7 | 1:4:8 | 1:4:9 |
| Polymer yield (%) after 8 hr at 65° C. | 81 | 89 | 86 |
| Melting temperature (° C.) | 187 | 186 | 186 |
| $M_w$ | 829,000 | 835,000 | 862,000 |
| $M_n$ | 432,000 | 409,000 | 445,000 |
| $M_w/M_n$ | 1.9 | 2.0 | 1.9 |

Example 15–17

In Examples 15–17, the procedure described in Example 3 was repeated except that iron(III) 2-ethylhexanoate was substituted for iron(II) 2-ethylhexanoate, and the catalyst ingredient ratio was varied as shown in Table V. The monomer charge, the amounts of the catalyst ingredients, and the properties of the resulting syndiotactic 1,2-polybutadiene are summarized in Table V. The $^1$H and $^{13}$C NMR analysis of the polymer produced in Example 16 indicated a 1,2-linkage content of 88.8% and a syndiotacticity of 81.2%.

TABLE V

| Example No. | 15 | 16 | 17 |
|---|---|---|---|
| 21.2% 1,3-Bd/hexanes (g) | 236 | 236 | 236 |
| Fe(2-EHA)$_3$ (mmol) | 0.050 | 0.050 | 0.050 |
| HP(O)(OSiMe$_3$)$_2$ (mmol) | 0.20 | 0.20 | 0.20 |
| AlEt$_3$ (mmol) | 0.20 | 0.25 | 0.30 |
| Fe/P/Al molar ratio | 1:4:4 | 1:4:5 | 1:4:6 |
| Polymer yield (%) after 6 hr at 65° C. | 93 | 94 | 91 |
| Melting temperature (° C.) | 160 | 160 | 160 |
| $M_w$ | 578,000 | 604,000 | 650,000 |
| $M_n$ | 237,000 | 273,000 | 311,000 |
| $M_w/M_n$ | 2.4 | 2.2 | 2.1 |

Examples 18–20

In Examples 6–8, the procedure described in Example 3 was repeated except that iron(III) 2-ethylhexanoate was substituted for iron(II) 2-ethylhexanoate, tri-n-butylaluminum was substituted for triethylaluminum, and the catalyst ingredient ratio was varied as shown in Table VI. The monomer charge, the amounts of the catalyst ingredients, and the properties of the resulting syndiotactic 1,2-polybutadiene are summarized in Table VI.

TABLE VI

| Example No. | 18 | 19 | 20 |
|---|---|---|---|
| 21.2% 1,3-Bd/hexanes (g) | 236 | 236 | 236 |
| Fe(2-EHA)$_3$ (mmol) | 0.050 | 0.050 | 0.050 |
| HP(O)(OSiMe$_3$)$_2$ (mmol) | 0.20 | 0.20 | 0.20 |
| n-Bu$_3$Al(mmol) | 0.20 | 0.25 | 0.30 |
| Fe/P/K molar ratio | 1:4:4 | 1:4:5 | 1:4:6 |
| Polymer yield (%) after 6 hr at 65° C. | 93 | 92 | 90 |
| Melting temperature (° C.) | 160 | 162 | 159 |
| $M_w$ | 585,000 | 587,000 | 595,000 |
| $M_n$ | 261,000 | 292,000 | 296,000 |
| $M_w/M_n$ | 2.2 | 2.0 | 2.0 |

Examples 21–23

In Examples 21–23, the procedure described in Example 3 was repeated except that iron(III) 2-ethylhexanoate was substituted for iron(II) 2-ethylhexanoate, triisobutylaluminum was substituted for triethylaluminum, and the catalyst ingredient ratio was varied as shown in Table VII. The monomer charge, the amounts of the catalyst ingredients, and the properties of the resulting syndiotactic 1,2-polybutadiene are summarized in Table VII.

TABLE VII

| Example No. | 21 | 22 | 23 |
|---|---|---|---|
| 21.2% 1,3-Bd/hexanes (g) | 236 | 236 | 236 |
| Fe(2-EHA)$_3$ (mmol) | 0.050 | 0.050 | 0.050 |
| HP(O)(OSiMe$_3$)$_2$ (mmol) | 0.20 | 0.20 | 0.20 |
| i-Bu$_3$Al(mmol) | 0.25 | 0.30 | 0.35 |
| Fe/P/Al molar ratio | 1:4:5 | 1:4:6 | 1:4:7 |
| Polymer yield (%) after 6 hr at 65° C. | 94 | 92 | 91 |
| Melting temperature (° C.) | 176 | 176 | 176 |
| $M_w$ | 807,000 | 894,000 | 835,000 |
| $M_n$ | 403,000 | 491,000 | 461,000 |
| $M_w/M_n$ | 2.0 | 1.8 | 1.8 |

Examples 24–26

In Examples 24–26, the procedure described in Example 3 was repeated except that bis(triethylsilyl) phosphonate was substituted for bis(trimethylsilyl) phosphonate, triisobutylaluminum was substituted for triethylaluminum, and the catalyst ingredient ratio was varied as shown in Table VIII. The monomer charge, the amounts of the catalyst ingredients, and the properties of the resulting syndiotactic 1,2-polybutadiene are summarized in Table VIII. The $^1$H and $^{13}$C NMR analysis of the polymer produced in Example 25 indicated a 1,2-linkage content of 96.1% and a syndiotacticity of 90.6%.

TABLE VIII

| Example No. | 24 | 25 | 26 |
|---|---|---|---|
| 21.2% 1,3-Bd/hexanes (g) | 236 | 236 | 236 |
| Fe(2-EHA)$_3$ (mmol) | 0.050 | 0.050 | 0.050 |
| HP(O)(OSiEt$_3$)$_2$ (mmol) | 0.20 | 0.20 | 0.20 |
| i-Bu$_3$Al (mmol) | 0.35 | 0.40 | 0.45 |
| Fe/P/Al molar ratio | 1:4:7 | 1:4:8 | 1:4:9 |
| Polymer yield (%) after 8 hr at 65° C. | 83 | 90 | 87 |
| Melting temperature (° C.) | 187 | 186 | 186 |
| $M_w$ | 836,000 | 832,000 | 883,000 |

TABLE VIII-continued

| Example No. | 24 | 25 | 26 |
|---|---|---|---|
| $M_n$ | 467,000 | 453,000 | 471,000 |
| $M_w/M_n$ | 1.8 | 1.8 | 1.9 |

Various modifications and alterations that do not depart from the scope and spirit of this invention will become apparent to those skilled in the art. This invention is not to be duly limited to the illustrative embodiments set forth herein.

What is claimed is:

1. A catalyst composition that is the combination of or the reaction product of ingredients comprising:

(a) an iron-containing compound;

(b) a silyl phosphonate; and (c) an organoaluminum compound.

2. The catalyst composition of claim 1, where said iron-containing compound is an iron carboxylate, iron organophosphate, iron organophosphonate, iron organophosphinate, iron carbamate, iron dithiocarbamate, iron xanthate, iron β-diketonate, iron alkoxide, iron aryloxide, organoiron compound or mixture thereof.

3. The catalyst composition of claim 1, where said silyl phosphonate is an acyclic silyl phosphonate defined by the following structure:

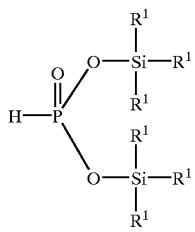

where each $R^1$, which may be the same or different, is a hydrogen atom or a mono-valent organic group.

4. The catalyst composition of claim 3, where $R^1$ is an alkyl, cycloalkyl, substituted cycloalkyl, alkenyl, cycloalkenyl, substituted cycloalkenyl, aryl, substituted aryl, aralkyl, alkaryl, allyl, or alkynyl group.

5. The catalyst composition of claim 4, where said acyclic silyl phosphonate is bis(trimethylsilyl) phosphonate, bis(triethylsilyl) phosphonate, bis(tri-n-propylsilyl) phosphonate, bis(triisopropylsilyl) phosphonate, bis(tri-n-butylsilyl) phosphonate, bis(tricyclohexylsilyl) phosphonate, bis(triphenylsilyl) phosphonate, bis[tris(2-ethylhexyl) silyl] phosphonate, or bis [tris (2,4,6-trimethylphenyl) silyl] phosphonate.

6. The catalyst composition of claim 1, where said silyl phosphonate is a cyclic silyl phosphonate that is defined by the following structure:

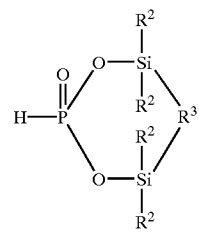

where each $R^2$, which may be the same or different, is a hydrogen atom or a mono-valent organic group, and $R^3$ is a bond between silicon atoms or a divalent organic group.

7. The catalyst composition of claim 6, where $R^2$ is an alkyl, cycloalkyl, substituted cycloalkyl, alkenyl, cycloalkenyl, substituted cycloalkenyl, aryl, substituted aryl, aralkyl, alkaryl, allyl, or alkynyl group, and where $R^3$ is an alkylene, substituted alkylene, cycloalkylene, substituted cycloalkylene, alkenylene, substituted alkenylene, cycloalkenylene, substituted cycloalkenylene, arylene, or substituted arylene group.

8. The catalyst composition of claim 7, where said cyclic silyl phosphonate is 2-oxo-(2H)-4,5-disila-1,3,2-dioxaphospholane, 2-oxo-(2H)-4,5-disila-4,4,5,5-tetramethyl-1,3,2-dioxaphospholane, 2-oxo-(2H)-4,5-disila-4,4,5,5-tetraphenyl-1,3,2-dioxaphospholane, 2-oxo-(2H)-4,6-disila-1,3,2-dioxaphosphorinane, 2-oxo-(2H)-4,6-disila-4,4,6,6-tetramethyl-1,3,2-dioxaphosphorinane, 2-oxo-(2H)-4,6-disila-4,4,6,6-tetraethyl-1,3,2-dioxaphosphorinane, 2-oxo-(2H)-4,6-disila-4,4,6,6-tetraphenyl-1,3,2-dioxaphosphorinane, 2-oxo-(2H)-4,6-disila-4,4,6,6-tetrabenzyl-1,3,2-dioxaphosphorinane, 2-oxo-(2H)-4,6-disila-4,6-dimethyl-1,3,2-dioxaphosphorinane, or 2-oxo-(2H)-4,6-disila-4,6-diethyl-1,3,2-dioxaphosphorinane.

9. The catalyst composition of claim 1, where the organoaluminum compound is defined by the formula $AlR_nX_{3-n}$, where each R, which may be the same or different, is a mono-valent organic group that is attached to the aluminum atom via a carbon atom, where each X, which may be the same or different, is a hydrogen atom, a carboxylate group, an alkoxide group, or an aryloxide group, and where n is an integer of 1 to 3.

10. The catalyst composition of claim 9, where each R is an alkyl, cycloalkyl, substituted cycloalkyl, alkenyl, cycloalkenyl, substituted cycloalkenyl, aryl, substituted aryl, aralkyl, alkaryl, allyl, or alkynyl group.

11. The catalyst composition of claim 10, where said organoaluminum compound is trihydrocarbylaluminum, dihydrocarbylaluminum hydride, hydrocarbylaluminum dihydride, dihydrocarbylaluminum carboxylate, hydrocarbylaluminum bis(carboxylate), dihydrocarbylaluminum alkoxide, hydrocarbylaluminum dialkoxide, dihydrocarbylaluminum aryloxide, hydrocarbylaluminum diaryloxide or mixtures thereof.

12. The catalyst composition of claim 1, where said organoaluminum compound is an oligomeric linear aluminoxane, an oligomeric cyclic aluminoxane, or a mixture thereof, where the oligomeric linear aluminoxane is defined by the formula:

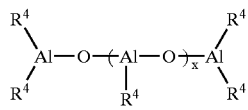

and the oligomeric cyclic aluminoxane is defined by the formula:

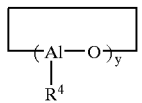

where x is an integer of 1 to about 100; y is an integer of 2 to about 100; where each $R^4$, which may be the same or different, is a mono-valent organic group that is attached to the aluminum atom via a carbon atom.

13. The catalyst composition of claim 12, where $R^4$ is an alkyl, cycloalkyl, substituted cycloalkyl, alkenyl, cycloalkenyl, substituted cycloalkenyl, aryl, substituted aryl, aralkyl, alkaryl, allyl, or alkynyl group.

14. The catalyst composition of claim 13, where said aluminoxane is methylaluminoxane, modified methylaluminoxane, ethylaluminoxane, n-propylaluminoxane, isobutylaluminoxane, or mixtures thereof.

15. The catalyst composition of claim 1, where the molar ratio of said organoaluminum compound to said iron-containing compound is from about 1:1 to about 200:1, and the molar ratio of said silyl phosphonate to said iron-containing compound is from about 0.5:1 to about 50:1.

16. The catalyst composition of claim 15, where the molar ratio of said organoaluminum compound to said iron-containing compound is from about 2:1 to about 100:1, and the molar ratio of the silyl phosphonate to said iron-containing compound is from about 1:1 to about 25:1.

17. A catalyst composition formed by a process comprising the steps of combining:
   (a) a iron-containing compound;
   (b) a silyl phosphonate; and
   (c) an organoaluminum compound.

18. A process for forming conjugated diene polymers comprising the step of:
   polymerizing conjugated diene monomers in the presence of a catalytically effective amount of a catalyst composition formed by combining:
   (a) a iron-containing compound;
   (b) a silyl phosphonate; and
   (c) an organoaluminum compound.

19. The process of claim 18, where said conjugated diene monomers are 1,3-butadiene.

20. The process of claim 18, where said catalytically effective amount includes from about 0.01 to about 2 mmol per 100 g of monomer.

* * * * *